United States Patent [19]

McCullough

[11] 4,136,275

[45] Jan. 23, 1979

[54] ELECTRICALLY HEATED ANCHOR INSERTION TOOL

[75] Inventor: Harold E. McCullough, Blacklick, Ohio

[73] Assignee: Bell Telephone Laboratories, Incorporated, Murray Hill, N.J.

[21] Appl. No.: 758,469

[22] Filed: Jan. 11, 1977

[51] Int. Cl.$^2$ .................. H05B 1/00; B27F 7/02; B29D 3/00

[52] U.S. Cl. ...................... 219/230; 29/432; 156/303.1; 156/579; 219/239; 219/243; 227/149; 227/156; 264/249; 264/271; 279/1 R; 425/517

[58] Field of Search .................. 219/221–241, 219/243, 533, 230; 156/303.1, 579, 293, 298, 92; 227/140, 149, 156; 145/30 R, 50 D; 264/259, 265, 271, 23, 273, 274, 249, 319; 425/517; 279/1 R, 2 R; 30/140; 29/432; 174/165

[56] References Cited

U.S. PATENT DOCUMENTS

| | | | |
|---|---|---|---|
| 573,245 | 12/1896 | Stotz et al. | 219/238 |
| 685,833 | 11/1901 | Grall | 219/221 X |
| 1,248,593 | 12/1917 | Arnold | 156/303.1 |
| 3,009,852 | 11/1961 | Gruner | 219/230 X |
| 3,045,336 | 7/1962 | Northrup et al. | 219/221 |
| 3,120,598 | 2/1964 | Westerback et al. | 219/229 |
| 3,184,353 | 5/1965 | Balamuth et al. | 174/165 UX |
| 3,265,781 | 8/1966 | Peterson | 264/249 X |
| 3,339,059 | 8/1967 | Spinka | 219/230 UX |
| 3,393,857 | 7/1968 | Taylor et al. | 228/55 |
| 3,593,001 | 7/1971 | Simpson et al. | 219/228 UX |
| 3,820,221 | 6/1974 | Mercer | 219/234 X |
| 3,926,356 | 12/1975 | Still | 227/156 X |
| 3,998,824 | 12/1976 | Otsuki et al. | 156/303.1 X |

*Primary Examiner*—A. Bartis
*Attorney, Agent, or Firm*—Dwight A. Marshall

[57] ABSTRACT

Apparatus for installing metallic inserts into thermoplastic material. The apparatus comprises a heating device in combination with a heating element having a first bore adapted to receive the heating device. The heating element is formed into an elongated tip specifically shaped to grasp a metallic insert which is then heated by conduction to a temperature suitable for melting the thermoplastic material. A longitudinal bore in alignment with the first bore and coupled thereto with a second bore extends through the heating element elongated tip. Plunger apparatus slidably inserted in the longitudinal bore and second bore is positioned by spring apparatus located in the second bore to maintain the metallic insert in engagement with the elongated tip of the heating element during the heating and insertion of the metallic insert into the thermoplastic material.

7 Claims, 4 Drawing Figures

ELECTRICALLY HEATED ANCHOR INSERTION TOOL

BACKGROUND OF THE INVENTION

This invention relates to apparatus for installing inserts. In particular, it relates to tool apparatus arranged to pick up, heat, and install a metallic insert into thermoplastic material.

In the field of telephony, thermoplastic material is used in a veriety of ways to manufacture telephone switching and station equipment items that provide telecommunication service. Sometimes these telephone items require repairs to be made so that they may continue to serve their intended use. Maintenance personnel, especially in servicing telephone switching equipment, find it highly desirable to install metallic inserts in thermoplastic material to repair and restore telephone switching equipment to telecommunication service. Thus, it would be useful to have apparatus arranged to install metal inserts into thermoplastic material to assemble and repair items made of thermoplastic material.

Apparatus designed to install metallic inserts into thermoplastic workpieces have been priorly disclosed in the art. For example, one such type of apparatus is arranged to receive a succession of metallic inserts that are continuously fed from a vibratory bowl feeder into the channel of a heated shoe of the apparatus. Each metallic insert is heated to the appropriate temperature by passing through the channel of the thermal shoe and the temperature of the metallic insert is maintained as it advances toward the thermoplastic workpiece. A catch member of the apparatus subsequently releases each insert into the path of a hydraulically controlled mandrel that forces the released insert through a tapered collet into engagement with the workpiece. The heated shoe conveys heat to both the hydraulical mandrel and the collet to maintain the temperature of the metallic insert.

The prior art apparatus is relatively cumbersome, expensive, and is primarily intended for the repetitive insertion of metallic inserts into thermoplastic material that is sometimes required for the assembly line manufacture of thermoplastic items. A need exists in the art for small portable inexpensive apparatus arranged for use in heating and inserting metallic inserts into thermoplastic material. A need also exists for tool apparatus arranged for use with a simple and inexpensive heating device to enable repair and maintenance personnel to affect repairs and assembly of items by inserting metallic inserts into thermoplastic material.

SUMMARY OF THE INVENTION

In the exemplary embodiment of the invention, apparatus is arranged to pick up, heat, and install metallic inserts into thermoplastic material. The apparatus comprises a heating element formed into a tip shaped to externally grasp and conductively heat a metallic insert to a temperature suitable for melting the thermoplastic material. A plunger assembly slidably disposed in the heating element is provided to engage the metallic element and a spring member positioned in the heating element biases the plunger assembly to maintain the metallic insert in engagement with the formed tip of the heating element during the heating and insertion of the metallic insert into the thermoplastic material.

In accordance with one feature of the invention, apparatus arranged for use with heating means to install inserts into thermoplastic material comprises a heating element formed into an elongated tip shaped for grasping and heating a metallic insert. The heating element has a longitudinal bore extending through the shaped tip and a first bore in alignment with the longitudinal bore adapted to receive the heating means. A second bore in alignment with the longitudinal bore is provided for communicating between the first bore and the longitudinal bore. Plunger apparatus slidably inserted in the longitudinal bore and the second bore of the heating element is biased by spring apparatus to maintain the metallic insert in engagement with the formed tip during heating and insertion of the metallic insert into the thermoplastic material.

In accordance with another feature of the invention, a tool for installing metallic inserts into thermoplastic material comprises a soldering iron in combination with a heating element formed into an elongated tip externally shaped for grasping and heating one of the metallic inserts. The heating element includes a longitudinal bore extending through the elongated tip, a first bore in alignment with the longitudinal bore and internally threaded to receive the soldering iron, and a second bore in alignment with the longitudinal bore and the first bore for communicating between the first bore and the longitudinal bore. A collar sized for slidably insertion in the second bore is affixed to a drill rod sized for slidable insertion in the longitudinal bore and the combination thereof is located in the heating element. A spring member positioned in the first bore in contact with the collar and soldering iron biases the drill rod into contact with the metallic insert to maintain the metallic insert in engagement with the formed tip of the heating element during heating and insertion of the metallic insert into the thermoplastic material.

DESCRIPTION OF THE DRAWING

The foregoing as well as other objects, features, and advantages of the invention will be more apparent from a description of the drawing in which.

DESCRIPTION OF THE INVENTION

1. Apparatus Description

Figure 1:
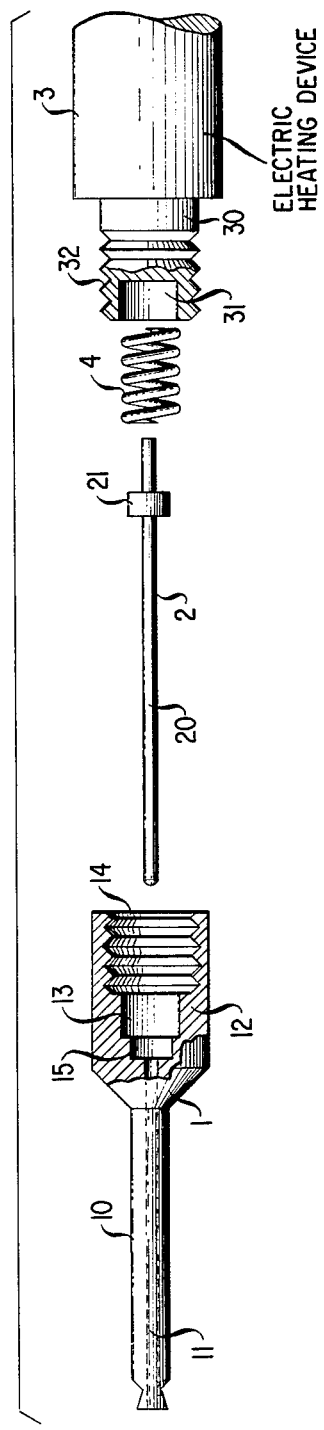
FIG. 1 is an exploded view of apparatus in accordance with the invention.

Referring to the drawing and more specifically to FIG. 1 of the drawing, the insertion tool apparatus therein set forth comprises an electrical heating device 3 of which only a fragmentary part is shown. Electrical heating device 3 may be any one of a number of types of heating devices well known in the art. For example, a standard commercially available soldering iron, such as a General Electric 60 watt 120 volt soldering iron, would be suitable for use as heating device 3. The end 30 of heating device 3 includes a bore 31 of a diameter sufficient to encompass spring 4 and is externally threaded 32 to be adapted for use with heating element 1.

Heating element 1 is formed into an elongated tip 10 designed and shaped to externally grasp and heat a metallic insert by conduction to a temperature suitable for melting thermoplastic material. A bore 11 within elongated tip 10 extends from the end thereof through elongated tip 10 to the body 12 of heating element 1. The rear of heating element body 12 is provided with a first bore 13 that is in alignment with longitudinal bore 11 and which is of a diameter sufficient to encompass spring 4. The first bore 13 of heating element 1 is internally threaded 14 to receive heating device 3. A second bore 15 having a diameter less than the diameter of first bore 13 and which is in alignment with longitudinal bore 11 is provided for use in communicating between first bore 13 and longitudinal bore 11.

A plunger assembly 2 intended for positioning within heating element 1 comprises a drill rod 20 having a cross-sectional area sized for slidable insertion in longitudinal bore 11 of heating element 1. A collar 21 is affixed to drill rod 20 and is of a cross-sectional area sized for slidable insertion in the second bore 15 of heating element 1. Drill rod 20 may be constructed of water hardened steel as described at page 275 of the *Materials Handbook*, G. S. Brady, Tenth Edition, 1971, McGraw-Hill, and collar 21 may either be silver soldered, ring staked, or press fitted thereto. Collar 21 is constructed of steel and is affixed to drill rod 20 at a location so that when plunger assembly 2 is positioned in heating element 1, in the manner hereinafter described in detail, the end thereof will extend beyond the end of elongated tip 10 to engage metallic insert 5.

The insertion tool apparatus also includes spring member 4 that is intended to be positioned within heating element 1. Spring member 4 is a highly compliant spring having an outside diameter sized for insertion in both bore 31 of heating device 3 and bore 13 of heating element 1. Although any of a number of well-known metal alloys may be used to make spring member 4, the alloy selected should exhibit a high strength at the elevated temperatures required to melt thermoplastic materials. One type of alloy that has been found suitable for such use is a heat resistant nickel-based alloy of the type described in column 1 of the table set forth on page 137 of the '70 *Materials Selector Issue*, Mid-October 1969, published by the Reinhold Publishing Corporation.

Figure 2:
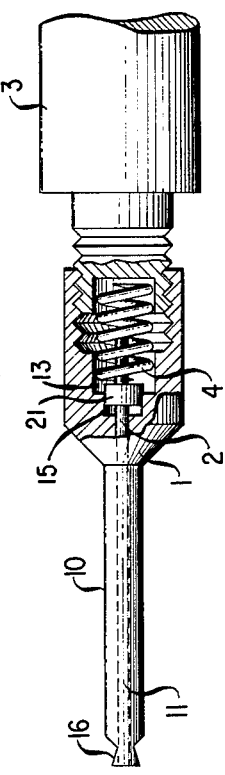
FIG. 2 is a sectional view showing the assembly of the apparatus of FIG. 1 comprising an insertion tool.
Figure 3:
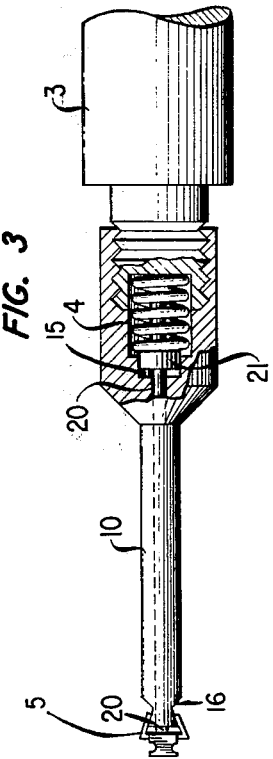
FIG. 3 is a sectional view showing the assembled plunger, spring, and heating element apparatus of the insertion tool.

Referring to FIG. 2 of the drawing, the insertion tool apparatus is assembled by inserting the end of drill rod 20 into longitudinal bore 11 and positioning the plunger assembly collar 21 into the second bore 15 of heating element 1. Spring 4 is then placed in bore 13 of heating element 1 over the top of drill rod 20 so that the end thereof rests on collar 21 of plunger assembly 2. Bore 31 of heating device 3 is positioned over the end of spring 4 and heating element 1 threaded onto end 30 of heating device 3. As set forth in FIG. 3, spring member 4 positioned in both bore 31 of heating device 3 and bore 13 of heating element 1 expands to hold plunger assembly collar 21 in bore 15 and thereby normally bias drill rod 20 slightly extended beyond the end of elongated tip 10. Highly compliant spring member 4 responds to a small force applied to the end of drill rod 20 by compressing and allowing the end of drill rod 20 to retract within elongated tip 10 of heating element 1.

2. Insertion Tool Operation

The insert tool apparatus embodying the principles of the present invention is intended for use in picking up or grasping a metallic insert, heating the metallic insert and then inserting the heated metallic insert into thermoplastic material. The apparatus may also be used to heat, pick up, and remove a metallic insert from thermoplastic material. One example of a metallic insert used in repairing relay spoolheads in electromechanical telephone switching systems is set forth as metallic anchor insert 5 in FIG. 4 of the drawing. Metallic anchor insert 5 comprises a base 51 having two opposing anchor tabs 53 bent with a gentle radius downwardly at right angles from base 51 and two opposing holding tabs 52 positioned upwardly from base 51 and inclined toward each other at a slight angle from a plane perpendicular to the edges of base 51.

Figure 4:
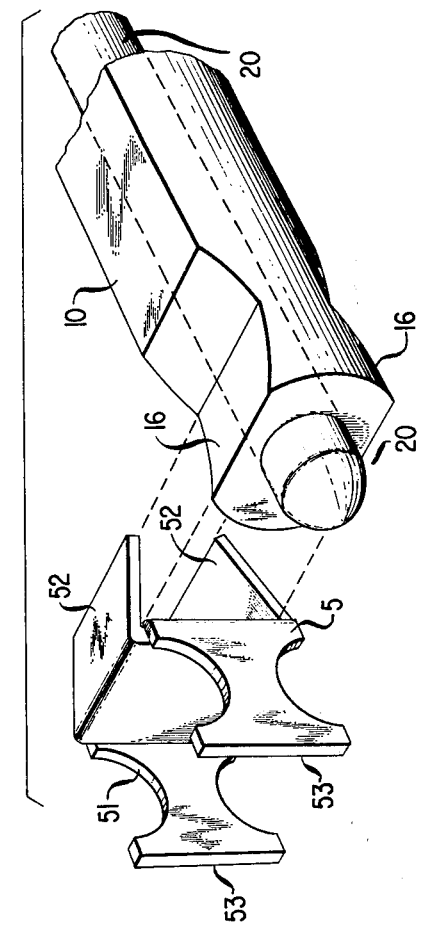
FIG. 4 is a fragmentary prospective view illustrating the manner in which a metallic insert is engaged and heated by the insertion tool apparatus set forth in the preceding figures.

Referring to FIG. 4 of the drawing, the pick up of metallic anchor insert 5 is initiated by positioning the elongated tip 10 of heating element 1 alongside one of the open sides between the two holding tabs 52. Elongated tip 10 is then moved so that the sloping sides thereof engage and move between holding tabs 52. When the extended end of drill rod 20 is moved along the gentle radius of one of the anchor tabs 53, the highly compliant spring member 4 compresses and thereby allows the end of drill rod 20 to retract within elongated bore 11 so that the formed tip 10 of heating element 1 may be located between holding tabs 52. Once the formed tip 10 of heating element 1 is positioned between holding tabs 52, spring member 4 expands to enable drill rod 20 to extend out beyond formed tip 10 to exert a downward force on base 51 of metallic anchor insert 5. The downward force applied to base 51 maintains holding tabs 52 in engagement with the sloping sides of the heating element tip 10 so that the metallic anchor insert 5 may be heated by the conduction of heat from heating device 3 through heating element 1 to a temperature suitable for melting thermoplastic material. The insertion tool apparatus is then used to insert anchor tabs 53 of heated metallic anchor insert 5 into the thermoplastic material by forcing base 51 perpendicularly down toward the surface of the thermoplastic material until anchor tabs 53 are firmly embedded therein. Disengagement is accomplished by moving heating element tip 11 sideways from between holding tabs 52 of the embedded metallic anchor insert 5.

SUMMARY

It is obvious from the foregoing that the facility, economy, and efficiency of assembling and repairing thermoplastic material items may be substantially enhanced by tool apparatus arranged to install a metallic insert into thermoplastic material. It is further obvious from the foregoing that tool apparatus comprising a heating device in combination with a heating element arranged to pick up, heat, and install a metallic insert into thermoplastic material alleviates the need to employ assembly line type of apparatus to assemble and repair items manufactured of thermoplastic material.

What is claimed is:

1. Apparatus for use with heating means to heat and install an insert into thermoplastic material comprising
    means adapted to receive a heating means and formed into a tip externally shaped for internally grasping and heating an insert by conductively transferring heat from the heating means to the insert;
    means slidably disposed in said grasping and conductively heating means for engaging the grasped insert; and
    means positioned in said grasping and conductively heating means for biasing said engaging means into engagement with the grasped insert to maintain the insert in engagement with said shaped tip during heating and insertion of the insert into the thermoplastic material.

2. The apparatus set forth in claim 1 wherein said grasping and heating means comprises a heating element, said heating element having
   an elongated tip externally shaped to engage the insert;
   a longitudinal bore extending through said elongated tip for slidably receiving said engaging means;
   a first bore in alignment with said longitudinal bore for receiving the heating means and said biasing means; and
   a second bore in alignment with both said longitudinal bore and said first bore slidably supporting said engaging means and communicating between said first bore and said longitudinal bore.

3. The apparatus set forth in claim 2 wherein said engaging means comprises a plunger assembly, said plunger assembly having
   a drill rod of a cross-section sized for slidable insertion in said longitudinal bore and having an end engageable with the grasped insert for maintaining the insert in engagement with said tip; and
   a collar affixed to said drill rod and sized for slidable insertion in said second bore to support said drill rod within said heating element in engagement with said biasing means.

4. The apparatus set forth in claim 3 wherein said biasing means is a compliant spring member positioned in said first bore for contact with the heating means and said collar to normally maintain an end of said drill rod extended beyond said shaped tip of said heating element.

5. Apparatus for use with heating means to heat and install a metallic insert into thermoplastic material, said apparatus comprising
   heating element means formed into a tip externally shaped for internally grasping and heating a metallic insert by conductively transferring heat from the heating means to the insert, said heating element means having a longitudinal bore extending through said tip, a first bore adapted for receiving the heating means and a second bore for communicating between said first bore and said longitudinal bore, said first and said second bores being in alignment with said longitudinal bore;
   plunger means having an end for engaging the grasped metallic insert, said plunger means having a first cross-section sized for slidable insertion in said longitudinal bore and a second cross-section sized for slidable insertion in said second bore; and
   spring means positioned in said first bore for contact with the heating means and said plunger means for biasing the end of said plunger means into engagement with the grasped metallic insert to maintain the metallic insert in engagement with said shaped tip during heating and insertion of the metallic insert into the thermoplastic material.

6. Apparatus for use with a soldering iron having an externally threaded heating end to heat and install a metallic insert into thermoplastic material, said apparatus comprising
   a heating element formed into an elongated tip externally shaped for internally grasping and heating a metallic insert, said heating element having a longitudinal bore extending through said elongated tip, a first bore in alignment with said longitudinal bore and internally threaded for receiving the threaded heating end of a soldering iron, and a second bore in alignment with both said longitudinal bore and said first bore for use in communicating between said first bore and said longitudinal bore;
   a drill rod of a cross-section sized for slidable insertion in said longitudinal bore;
   a collar affixed to said drill rod and sized for slidable insertion in said second bore; and
   a spring member positioned in said first bore for contact with the threaded end of the soldering iron and said collar for biasing an end of the drill rod into engagement with the grasped metallic insert to maintain the metallic insert in engagement with said elongated tip during heating and insertion of the metallic insert into the thermoplastic material.

7. A tool for installing a metallic insert into thermoplastic material comprising
   a soldering iron having an externally threaded heating end;
   a heating element formed into an elongated tip externally shaped for internally grasping and heating a metallic insert by conductively transferring heat from the heating end of the soldering iron to the insert, said heating element having a longitudinal bore extending through said tip, a first bore internally threaded for receiving the threaded heating end of said soldering iron, and a second bore for communicating between said first bore and said longitudinal bore, said first bore and said second bore being in alignment with said longitudinal bore;
   a drill rod of a cross-section sized for slidable insertion in said longitudinal bore;
   a collar affixed to said drill rod and sized for slidable insertion in said second bore; and
   a spring positioned in said first bore in contact with said collar and the end of said soldering iron for biasing an end of said drill rod into engagement with said grasped insert to maintain the metallic insert in engagement with said shaped tip during heating and insertion of the metallic insert into the thermoplastic material.

* * * * *